Nov. 2, 1948.  R. S. JESIONOWSKI  2,452,761
METHOD OF FORMING SLABS OF ORGANIC PLASTIC MATERIAL
Filed Feb. 16, 1944  2 Sheets-Sheet 1
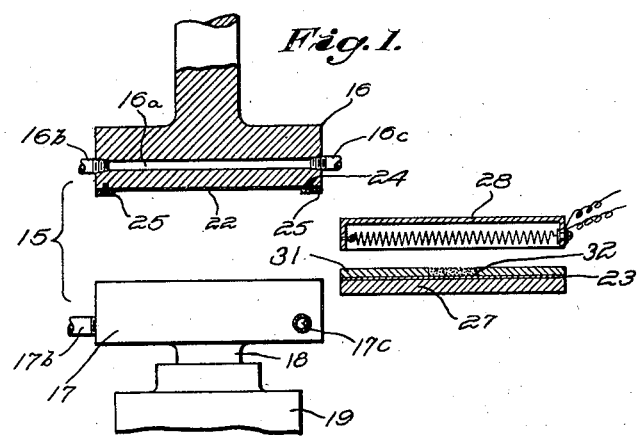
Fig. 1.
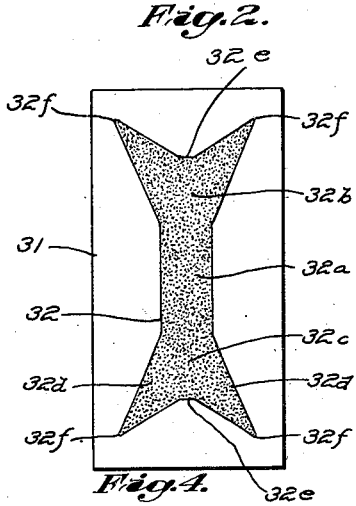
Fig. 2.
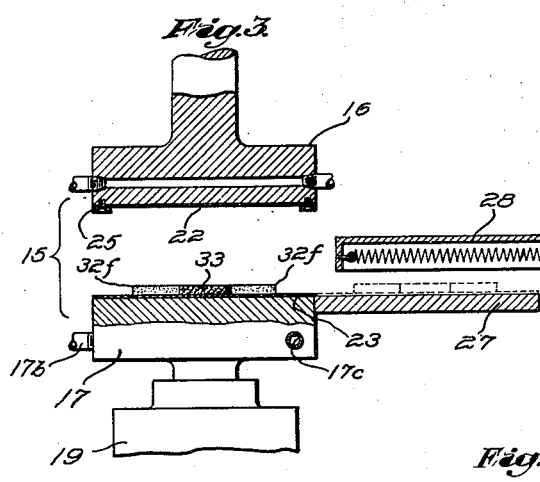
Fig. 3.
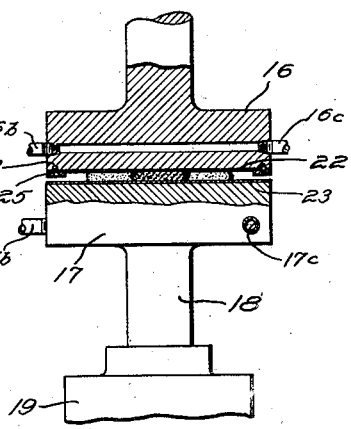
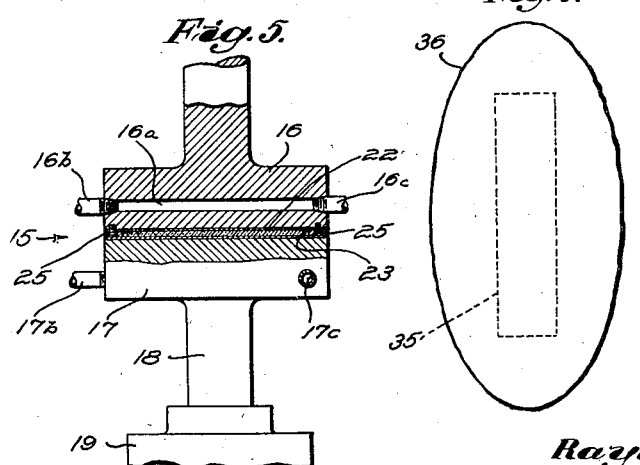
Fig. 5.  Fig. 7.
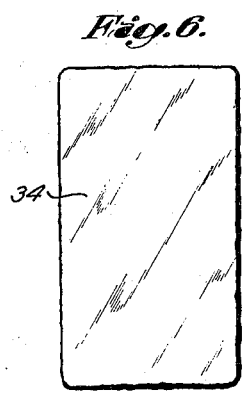
Fig. 6.
Inventor
Raymond S. Jesionowski
By Brown Markham
Attorneys Nov. 2, 1948.    R. S. JESIONOWSKI    2,452,761
METHOD OF FORMING SLABS OF ORGANIC PLASTIC MATERIAL
Filed Feb. 16, 1944    2 Sheets-Sheet 2
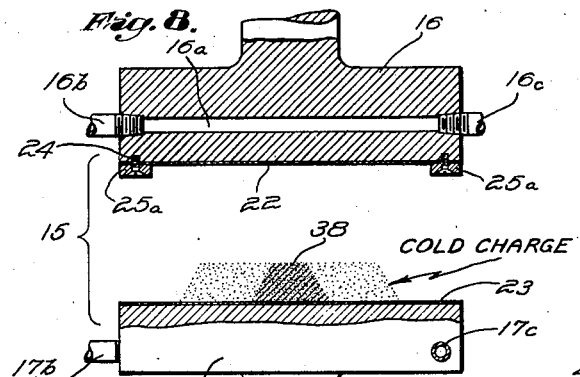
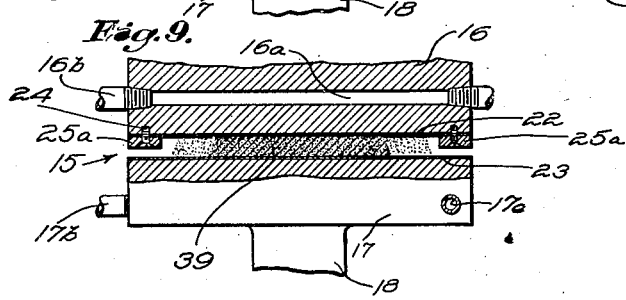
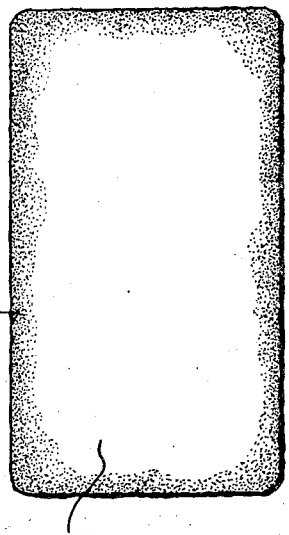
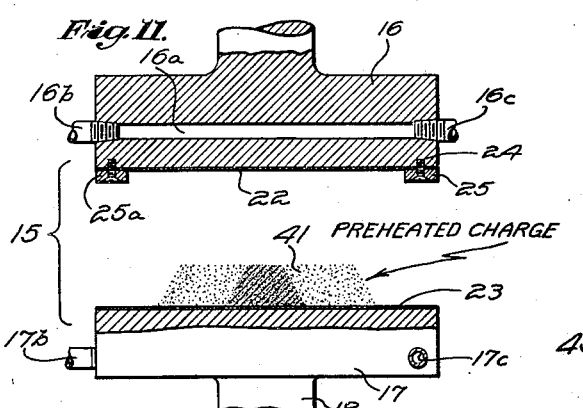
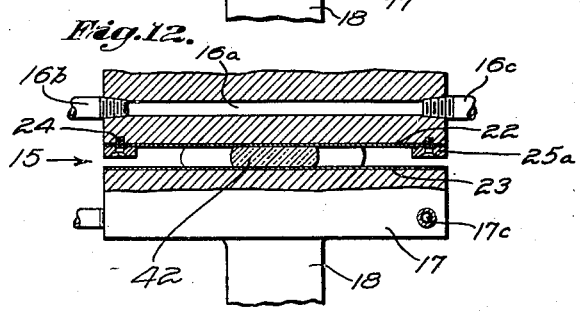
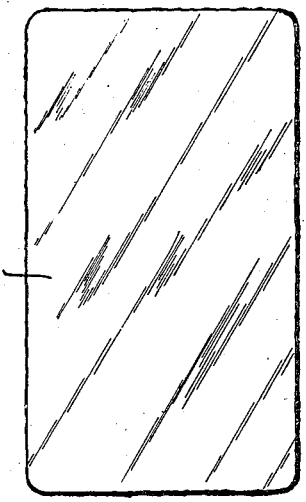
Inventor
Raymond S. Jesionowski Patented Nov. 2, 1948

2,452,761

UNITED STATES PATENT OFFICE 2,452,761

METHOD OF FORMING SLABS OF ORGANIC PLASTIC MATERIAL

Raymond S. Jesionowski, Hartford, Conn., assignor to Plax Corporation, Hartford, Conn., a corporation of Delaware Application February 16, 1944, Serial No. 522,602

7 Claims. (Cl. 18—47.5)

This invention relates to methods of forming slabs of organic plastic material and has particular relation to the forming of such slabs from molding powder by heat and compression.

The general object of the invention is to produce slabs of plastic material of good quality by heating and compressing molding powder, the requirements for good quality being lack of cracks or crack producing strains, little if any flow lines, little if any grain effect from the use of granular molding powder, a good and preferably polished surface, little if any bubbles and the desired uniform thickness.

A more specific object is to produce such slabs of good quality and in approximately rectangular shape.

Another object is to produce such slabs of good quality efficiently and at a low cost of production.

It has been found that slabs of plastic material of good quality cannot be produced by usual methods of compression molding a molding powder, at least when certain types of molding compounds are used. One reason for this is that in the usual compression molding methods more than enough molding powder to fill the mold is used, the excess material forming a flash on the molded edges of the article. While many satisfactory articles can be produced in this way, the flash and molded edges are apt to stick to the mold and thus cause cracks or strains when shrinkage occurs or as the article is removed from the mold. Also the articles are apt to contain flow lines and to show grain effect because of the way in which the charge is distributed in the mold before molding starts and because the plastic material does not become sufficiently homogeneous before final shape is attained.

The present invention largely or entirely overcomes the above difficulties by what may be called "flashless" laterally unobstructed compression forming. Thus, instead of introducing an excessive amount of molding powder into a mold and forming a slab with molded edges having flash thereon as in prior methods, a weighed charge, preferably in a preheated state is compressed between parallel forming surfaces in a press in such a way that lateral flow of the plastic material is unobstructed by any mold sides or other surfaces and a slab is formed with unmolded edges and without flash. The thickness of the slab is predetermined by positively limiting the closing of the press and the shape of the slab is predetermined and controlled by forming the charge into a pattern selected according to the shape of slab desired. Preferably, the edges of the charge before pressing are a substantial distance from the edges of the forming surfaces and from where the edges of the slab will be to produce a substantial horizontal flow of the plastic material, this being desirable to prevent flow lines and grain effect in the finished article.

The invention will now be described by reference to the accompanying drawings which depict embodiments of the invention and in which drawings:

Figure 1 is a view in vertical, sectional elevation of portions of a press and associated means for carrying out the invention;

Fig. 2 is a view in top plan of a frame or pattern for forming a mold charge to a shape which will form an approximately rectangular slab under heat and compression in the press of Fig. 1;

Fig. 3 is a view similar to Fig. 1 showing the loading of the press;

Fig. 4 is a view similar to Fig. 1 showing the initial closing of the press and showing in vertical sectional elevation a charge of molding powder formed to a selected pattern;

Fig. 5 is a view similar to Fig. 1 showing the final closing of the press;

Fig. 6 shows a slab of plastic material formed by the operations illustrated in Figs. 1 to 5;

Fig. 7 shows an elliptical slab formed from a charge of rectangular shape;

Figs. 8 and 9 are views similar to Figs. 3 and 4 illustrating two steps in the forming of a relatively thick slab from a shaped charge of cold molding powder and Fig. 10 shows the resulting slab; and Figs. 11 and 12 are views similar to Figs. 8 and 9 illustrating two steps in the forming of a slab from a preheated charge of molding powder of selected shape and Fig. 13 shows the slab.

In carrying out the invention any well known type of press may be used, a conventional upstroke press 15 being shown, comprising a stationary upper platen 16 and the movable lower platen 17 on ram 18 in cylinder 19. The platens are cored as shown at 16a and have connections 16b and 16c and 17b and 17c through which steam or other heating medium may be passed to heat the platens and through which cold water may be passed to cool the platens all in known manner.

The compression of the molding powder preferably is effected between polished surfaces which may be provided one on plate 22 secured to platen 16 and the other on plate 23 which may be slid onto and off of the platen 17. Plate 22 may be secured to platen 16 by screws 24 which also hold the edges or stops 25 on the underside of platen 16 at opposite sides of the platen. The stops need not extend the full lengths of the sides of the platens and they may comprise one or more separated members because they do not mold or form the slabs. Also the stops 25 preferably are interchangeable with stops of various thicknesses for use in forming slabs of corresponding thicknesses. Any desired type of stop may be used which will positively limit the closing of the press and thus form the slabs to the desired thickness.

A loading table 27 may be located at one side of the press and an electric heater 28 supported over it to heat the charges. Any suitable preheating means of known type may be used.

The charges may be shaped to a selected pattern by means of a form or loading board 31 cut to the desired pattern as shown by the opening at 32. The form or loading board 31 may be of the same exterior size and rectangular outline as plate 23 and the charge shaped on the plate by placing the form on it with its edges even with those of the plate as shown in Fig. 1, filling or partially filling the opening or cavity 32 of the form with molding powder and then removing the form. The charge should be leveled off in the form before the form is removed. The shaped charge, which will be centrally located on the plate, may now be preheated as by heater 28 or by other suitable heating means, such as an oven (not shown), which may be adapted to heat simultaneously several charges on additional plates 23.

When it is desired to make rectangular slabs, the opening or cavity 32 of the form or loading board may be advantageously shaped approximately as shown in Fig. 2, this shape being selected to form an approximately rectangular slab, which would not otherwise be formed. It will be seen that this shape of the cavity is approximately that of a bow tie, having a narrow, straight elongated central portion 32a with parallel sides and end portions 32b and 32c, each having diverging sides and reentrant ends 32e in the general shape of wings or fish tails, the tapered tips 32f of which are directed toward the corners of the board or form 31. This shape of the cavity forms a relatively compact charge best suited to form a rectangular shape and requiring a substantial flow of plastic material from the initial boundaries of the charge outwardly of the charge consistent with the required distribution to form a rectangular shape in the absence of mold sides.

The volume of the molding powder placed in cavity 32 is insufficient to fill the space between plates 22 and 23 and the stops 25 when the press 15 is closed and insufficient to cause the plastic material to be forced into contact with the stops 25 or over the edges of the plates.

In performing the novel method, and considering for example the production of slabs about ⅛ inch thick from commercial polystyrene molding powder, plate 23 preferably is lubricated, the form 31 is placed thereon as shown in Fig. 1 and a weighed charge of molding powder placed in cavity 32 and evenly distributed therein. The form 31 is now removed leaving a charge 33 of the selected pattern on plate 23. Plate 22 also preferably is lubricated. The charge may now be loaded into the press by sliding the plate 23 onto and into registry with platen 17 as shown in Fig. 3. It is preferred to preheat the charge as will be explained below but slabs of good quality can be produced without preheating if the final thickness does not exceed approximately ⅛ inch in thickness.

Meantime the press platens 16 and 17 will have been heated to approximately 300° F.

When the plate 23 with the charge 33 has been placed in the press, the press may be closed under low pressure applied to ram 18 which moves platen 17 upwardly until the charge 33 comes into contact with plate 22 as shown in Fig. 4. Such contact is effected gradually and carefully to prevent sudden striking of the charge against plate 22 which would destroy the shape of the charge. With a cold (not preheated) charge, the press may now be held under low pressure for about 3 minutes to heat the charge which will start to flow at the end of this time. High pressure may now be applied so that the heat softened material is compressed and flows out in all directions as the press closes, this requiring about 5 minutes. The press is closed when plate 23 contacts stops 25 as shown in Fig. 5.

The steam or other heating medium is now turned off and cooling water circulated through the platens 16 and 17 to cool the slab. A cooling period of about 12 minutes may be required. When the cooling is sufficient the press is opened and the slab removed.

Fig. 6 shows a slab produced in the above manner. It will be seen that the slab is rectangular in shape with slightly rounded corners and irregular or rough (unformed) edges which may be cut or ground to provide smooth edges.

Other shapes of slabs may be formed from charges of predetermined shapes or patterns. Thus, as shown in Fig. 7, a charge of rectangular shape, indicated by the dash lines at 35, may be used to form an elliptical slab 36.

While relatively thin slabs, of the order of ⅛ inch in thickness may be produced of good quality without preheating, this is not true of relatively thick slabs, that is of approximately $\frac{3}{16}$ of an inch or more thick. Thus, as shown in Figs. 8 and 9, if a charge 38 should be used of the same shape as shown in Figs. 1, 2 and 3 but of sufficiently greater thickness to form the thicker slab, and the charge is not preheated, the charge would be flattened and spread by the initial closing of the press under low pressure and thus granular flow toward the edges of the plate 23 would occur before appreciable heating of the charge. The compressed charge would have the shape and size about as shown at 39 in Fig. 9. Upon further heating and final closing of the press, limited by thicker stops 25a, and subsequent cooling, a slab 40 would be formed having a bubbled marginal edge portion 40a as shown by Fig. 10. Such edge portion would be defective and would have to be cut off as waste material.

Such a defective marginal portion is avoided and the time of the forming cycle greatly reduced by preheating the charge. Thus a charge of polystyrene molding powder may be preheated on plate 23 to a temperature of approximately 250° F. for about 1 hour or until the charge is rubbery and the grains of the charge are stuck together. Such a charge is indicated at 41, Fig. 11, positioned in the press 15 on plate 23. When the press is closed under low pressure, instead of the charge spreading by granular flow as in Fig. 9, the charge is first compressed to a relatively dense condition without spreading, as shown at 42, Fig. 12. Upon further heating and compression, final closing of the press and cooling, a bubble-free slab is produced, as shown at 43, Fig. 13.

The prevention of bubbles by the use of a preheated charge is believed to be due largely to the fact that air in the charge 41 is expelled therefrom by the initial compression thereof and before spreading as shown in Fig. 12 whereas with the cold charge 38, little if any air is expelled when the charge is flattened as shown in Fig. 9. When the flattened charge 39 of Fig. 9 is heated and the press finally closed to form the slab 40, the plastic material does not flow horizontally as much as does the compressed charge 42 because the edges of charge 39 are closer to the edges of plate 23 than the edges of preheated charge 42 when plastic flow is about to begin. Therefore, there is less opportunity for entrapped air to work out in the final stage of forming with charge 39 than with charge 42 and this may account for the presence of bubbles in the sheet 40.

The lack of bubbles in relatively thin slabs produced from cold (not preheated) charges probably is due to the fact that the charge is not thick enough to flatten out very much, if any, upon initial contact with plate 22 and therefore horizontal plastic flow is not thereby materially reduced and the air in the material has sufficient opportuntiy to work out before cooling starts.

However, it is preferred to preheat all charges to a rubbery, coherent state because, in addition to the prevention of bubbles in thick shapes and other advantages, the total length of the press cycle can be greatly reduced. Thus, in forming a certain size of slab from a cold charge, a period of 15 minutes is required to close the press, heat the charge and form the slab up to the time the heating is stopped and cooling is started. On the other hand, when the same charge is preheated as described above, the said period of 15 minutes is reduced to as little as 30 seconds, and the press cycle shortened as much as 14½ minutes.

Enough charges usually are heated at one time to keep the press in continuous operation so that the slabs are produced efficiently and at a low cost of production.

From the foregoing, it will be understood that the shape of the slab is predetermined by the pattern of the charge and not by mold sides or edges. By preventing contact of the edges of the slab with mold sides, the stops or other metal surfaces, the slabs are free to shrink during cooling without cracking or strains such as may result when a mold is used and a flash is formed.

It is believed that the lack of flow lines and grain effect is due principally to the substantial amount of horizontal plastic flow of the material from the edges of the charge toward the edges of the plates 22 and 23 during the pressing operation. This movement is thought to cause a stirring or mixing action which tends to make the material homogeneous. The polished and lubricated plates assist this flow in addition to forming polished surfaces on the slabs and preventing sticking.

The invention may be used to produce slabs from polymethyl methacrylate, cellulose acetate and other thermoplastic materials and from phenol-formaldehyde, urea, melamine and other types of thermosetting materials. In using thermosetting materials, the cooling may be omitted or a shortened cooling period may be employed.

Various changes may be made in the embodiments illustrated and described without departing from the scope of the appended claims.

Having thus described my invention, what I desire to claim and secure by Letters Patent is:

1. The method of forming an approximately rectangular slab of organic plastic material which comprises forming a charge of molding powder to a pattern selected to form said rectangular slab, said pattern being approximately that of a bow tie and having reentrant ends, placing said charge between parallel horizontal forming surfaces of a press, and subjecting the charge to heat and pressure in said press to reduce the material of the charge to a predetermined lesser thickness and causing unobstructed horizontal flow of the material until said approximately rectangular slab is formed.

2. The method of forming an approximately rectangular slab of organic plastic material which comprises arranging on a press plate a pile of granular molding powder to approximately the shape of a bow tie and having reentrant ends, placing the plate between parallel surfaces of the heated platens of a press, partially closing the press and heating the molding powder while the press remains partially closed, finally closing the press to cause the heated plastic material to flow unobstructedly laterally in all directions as the press closes to form the slab to its final shape and thickness, cooling the platens of the press to cool the slab thus formed and removing the slab from the press.

3. The method of forming a slab of organic plastic material which comprises supporting a charge of granular molding powder on a press plate, laterally confining and shaping said granular charge to a substantially uniform depth in a loading board removably supported on said press plate, removing said loading board and leaving on the press plate a laterally unconfined granular powder charge of substantially uniform depth in the shape imparted by the loading board, placing the plate supported charge in a press between parallel press members, applying a first pressure on said charge by partially closing the press members, heating the charge of molding powder while applying said first pressure to cause said granular charge to become plastic and flow, applying further pressure to the plastic charge by further closing the press members while supplying additional heat to said charge, limiting the closing of the press members to a predetermined spacing while permitting unobstructed lateral flow of the plastic in such a manner as to form therebetween a laterally unconfined slab of predetermined thickness and shape, cooling the slab, and removing the slab from the press.

4. The method of forming a slab of organic plastic material which comprises supporting a charge of granular molding powder on a press plate, laterally confining and shaping said granular charge to a substantially uniform depth in a loading board removably supported on said press plate, removing said loading board and leaving on the press plate a laterally unconfined granular powder charge of substantially uniform depth in the shape imparted by the loading board, preheating the laterally unconfined, shaped charge, placing the plate supported charge in a press between parallel press members, applying a first pressure on said charge by partially closing the press members, heating the charge of molding powder while applying said first pressure to cause said granular charge to become plastic and flow, applying further pressure to the plastic charge by further closing the press members while supplying additional heat to said charge, limiting the closing of the press members to a predetermined spacing while permitting unobstructed lateral flow of the plastic in such a manner as to form therebetween a laterally unconfined slab of predetermined thickness and shape, cooling the slab, and removing the slab from the press.

5. The method of forming an approximately rectangular slab of organic plastic material which comprises forming a charge of granular molding powder into a pattern, said pattern having an approximately uniform thickness and having the approximate shape of a bow tie having reentrant ends, placing the patterned charge in a press between parallel surfaces of upper and lower press members, applying a first pressure on said charge by partially closing the press members, heating the patterned charge of molding powder while applying said first pressure to cause said granular charge to become plastic and flow, applying further pressure and heat to the plastic charge by closing the heated press members, limiting the closing of the members to a predetermined spacing while permitting unobstructed lateral flow of the plastic in such a manner as to form therebetween a laterally unconfined slab of predetermined thickness and approximately rectangular shape, and removing the slab from the press.

6. The method of forming an approximately rectangular slab of organic plastic material which comprises forming a charge of granular molding powder into a pattern, said pattern having an approximately uniform thickness and having the approximate shape of a bow tie having reentrant ends, preheating the charge, placing the patterned charge in a press between parallel press members, applying a first pressure on said charge by partially closing the press members, heating the patterned charge of molding powder while applying said first pressure to cause said granular charge to become plastic and flow, applying further pressure to the plastic charge by further closing the press members while supplying additional heat to the charge, limiting the closing of the press members to a predetermined spacing while obtaining unobstructed lateral flow of the plastic in such a manner as to form therebetween a laterally unconfined slab of predetermined thickness and approximately rectangular shape, and removing the slab from the press.

7. The method of forming an approximately rectangular slab of organic plastic material which comprises supporting a charge of granular molding powder on a press plate, laterally confining and shaping said granular charge to a substantially uniform depth in a loading form supported on said press plate and having the approximate shape of a bow tie and having reentrant ends, removing said loading board and leaving the laterally unconfined charge of granular powder in the described shape on the press plate, placing the plate supported charge in a press between parallel surfaces of press members, applying a first pressure on said charge by partially closing the press members, heating the charge of molding powder while applying said first pressure to cause said granular charge to become plastic and flow, applying further pressure and heat to the plastic charge by further closing the press member, limiting the closing of the platens to a predetermined spacing while obtaining unobstructed lateral flow of the plastic in such a manner as to form a laterally unconfined slab of predetermined thickness and approximately rectangular shape, cooling the slab, and removing the slab from the press.

RAYMOND S. JESIONOWSKI.

REFERENCES CITED

The following references are of record in the file of this patent:

UNITED STATES PATENTS

| Number | Name | Date |
| --- | --- | --- |
| 628,120 | Semmer | July 4, 1899 |
| 1,232,022 | Gammeter | July 3, 1917 |
| 1,578,448 | Lebby | Mar. 30, 1926 |
| 1,812,564 | Sloan | June 30, 1931 |
| 1,812,565 | Sloan | June 30, 1931 |
| 1,822,172 | Pfleumer et al. | Sept. 8, 1931 |
| 1,951,999 | Sprague | Mar. 20, 1934 |
| 2,068,361 | Ward | Jan. 19, 1937 |
| 2,139,541 | Farnsworth | Dec. 6, 1938 |
| 2,224,852 | Lowry | Dec. 17, 1940 |
| 2,294,796 | Moulder | Sept. 1, 1942 |
| 2,332,537 | Slatis | Oct. 26, 1943 |